W. E. GWYER.
Governor for Vulcanizing Apparatus.
No. 238,894. Patented March 15, 1881.
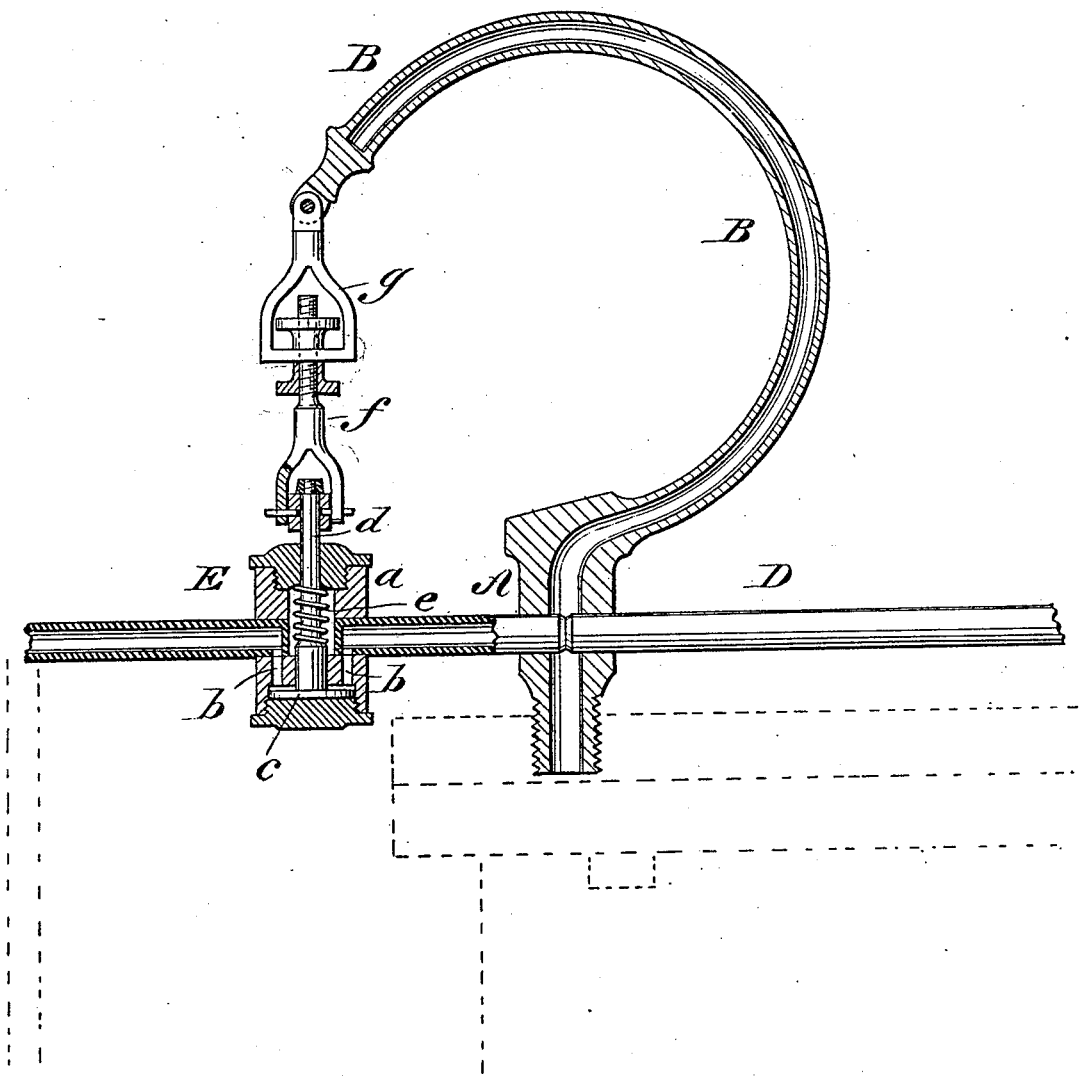
WITNESSES:
Donn P. Twitchell
C. Sedgwick
INVENTOR:
W. E. Gwyer
BY Munn & Co
ATTORNEYS.

UNITED STATES PATENT OFFICE.

WILLIAM E. GWYER, OF NEW YORK, N. Y.

GOVERNOR FOR VULCANIZING APPARATUS.

SPECIFICATION forming part of Letters Patent No. 238,894, dated March 15, 1881.

Application filed January 15, 1881. (No model.)

*To all whom it may concern:*

Be it known that I, WILLIAM E. GWYER, of the city, county, and State of New York, have invented a new and useful Improvement in Governors for Vulcanizing Apparatus, of which the following is a full, clear, and exact description.

With vulcanizers in which the required temperature is obtained by confining the steam, especially those used by dentists, the proper regulation of the temperature is of the utmost importance, and has heretofore been attended with difficulty. The usual method is to regulate the flow of gas to the steam-generator by hand; but such method is unreliable.

My invention has for its object the automatic regulation of the flow of gas by a governor worked by the steam-pressure, whereby the pressure, and consequently the temperature, is maintained at a nearly uniform point; and to this end my invention consists in a gas-cock opened by a spring and closed by steam-pressure, for regulation of the flow of gas, as hereinafter explained.

In the accompanying drawing my invention is illustrated by a sectional elevation of the governor.

A is a hollow screw-plug adapted for connection, by a pipe or otherwise, with the shell of the steam-box of the vulcanizer, which may be of any usual construction, as illustrated by the dotted lines.

B is a Burdon spring, the same being a flat tube bent in C form, having its outer end closed, and attached, by the other end, to the plug A, by which the spring is sustained.

D is the gas-supply pipe, shown as passing through plug A, and fitted with a cock or valve, E, between the source of gas-supply and the burners. The valve shown is constructed to cut off and open the gas-pipe by a limited extent of movement. For this purpose the valve-case *a* separates the gas-pipe, and the separated ends connect with passages *b b* that extend to the face of the valve-seat.

The valve *c* is a disk on the end of stem *d*, which carries a spiral spring, *e*, tending to retain the valve off from its seat, and thus allow communication between the passages *b*.

On the outer end of valve-stem *d* a rod, *f*, is connected by a swivel-joint, and this rod *f* is connected, by a turn-buckle, *g*, with the free end of the spring B. The turn-buckle allows adjustment of the valve, so that it shall be retained normally open by the spring *e*, and until the expansion of spring B by the steam-pressure passes a given point.

In operation, the curve of the hollow C-spring B is enlarged in proportion to increase the steam-pressure, and when the pressure passes beyond the point at which the governor is set the valve-stem is raised and the flow of gas through valve E thereby checked until, by reduction of heat, the steam-pressure is reduced, when the spring B reacts and opens the valve.

This governor, being operated by the pressure, acts instantly, and for that reason is more prompt and reliable than governors dependent for movement on expansion and contraction by changes of temperature.

I do not limit myself to the pressure-spring shown for obtaining movement of the valve by variations in steam-pressure, as an ordinary diaphragm might be used with the spring-acted gas-cock.

Having thus described my invention, I claim as new and desire to secure by Letters Patent—

1. In governors for vulcanizers, the combination of a spring-opened gas cock or valve and a spring fitted for movement, by the pressure in the steam-box, to close the cock, substantially as shown and described.

2. The governor for vulcanizers, consisting of the hollow C-spring B, valve E, turn-buckle connections *g*, gas-pipe D, and hollow screw-plug A, substantially as shown and described, combined for operation, as set forth.

3. The combination, with the gas-supply pipe of vulcanizing apparatus, of a cock or valve, E, fitted for being closed by connections actuated directly by the pressure in the steam-box, substantially as shown and described.

WILLIAM E. GWYER.

Witnesses:
GEO. D. WALKER.
C. SEDGWICK.